(12) United States Patent
March et al.

(10) Patent No.: US 11,794,738 B2
(45) Date of Patent: Oct. 24, 2023

(54) FILTERED BATTERY CURRENT BASED VEHICLE SPEED LIMITER

(71) Applicant: FORD GLOBAL TECHNOLOGIES, LLC, Dearborn, MI (US)

(72) Inventors: Zachary March, Pinckney, MI (US); Bryan Michael Bolger, Canton, MI (US); Gary Lepidi, Riverview, MI (US); Sergey Gennadievich Semenov, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 296 days.

(21) Appl. No.: 17/079,960

(22) Filed: Oct. 26, 2020

(65) Prior Publication Data

US 2022/0126825 A1    Apr. 28, 2022

(51) Int. Cl.
| | | |
|---|---|---|
| *B60W 30/14* | (2006.01) |
| *B60K 1/00* | (2006.01) |
| *B60K 1/04* | (2019.01) |
| *B60L 15/20* | (2006.01) |
| *B60K 26/02* | (2006.01) |

(Continued)

(52) U.S. Cl.
CPC ........... *B60W 30/146* (2013.01); *B60K 1/00* (2013.01); *B60K 1/04* (2013.01); *B60K 26/02* (2013.01); *B60L 15/20* (2013.01); *B60R 16/033* (2013.01); *B60W 10/08* (2013.01); *B60W 40/08* (2013.01); *B60K 2026/026* (2013.01); *B60W 2510/242* (2013.01); *B60W 2520/10* (2013.01); *B60W 2540/10* (2013.01); *B60Y 2300/60* (2013.01)

(58) Field of Classification Search
CPC .... B60W 30/146; B60W 10/08; B60W 40/08; B60W 2510/242; B60W 2520/10; B60W 2540/10; B60K 1/00; B60K 1/04; B60K 26/02; B60K 2026/026; B60K 31/04; B60K 2031/0091; B60L 15/20; B60L 2240/423; B60L 2240/429; B60L 2240/549; B60L 58/13; B60L 15/2045; B60L 2240/547; B60R 16/033; B60Y 2300/60; Y02T 10/64; Y02T 10/70; Y02T 10/72
See application file for complete search history.

(56) References Cited

U.S. PATENT DOCUMENTS 9,415,764 B2    8/2016    Zhang et al.
9,475,480 B2   10/2016    Ishishita et al.
(Continued)

FOREIGN PATENT DOCUMENTS

EP    3340131 A1 *    6/2018    ............. B60L 50/60

*Primary Examiner* — Brian P Sweeney
(74) *Attorney, Agent, or Firm* — David B Kelley; Brooks Kushman P.C.

(57) ABSTRACT

According to one embodiment, a vehicle includes an electrified propulsion system having an electric machine powered by a traction battery over an electrical distribution system (EDS). A controller is programmed to, reduce a speed limit of the vehicle from a maximum speed limit to an EDS speed limit in response to a measured average current of the EDS being within a threshold percentage of an average current limit of the EDS, and, in response to a measured speed of the vehicle exceeding the EDS speed limit, command a torque to the electric machine that is less than a driver-demanded torque such that the vehicle is propelled at a speed below the EDS speed limit.

15 Claims, 3 Drawing Sheets

(51) Int. Cl.
*B60W 40/08* (2012.01)
*B60R 16/033* (2006.01)
*B60W 10/08* (2006.01)

(56) References Cited

U.S. PATENT DOCUMENTS 10,421,462 B2    9/2019   Lin et al.
2020/0062124 A1*   2/2020   Haputhanthri .......... B60L 58/12

* cited by examiner

FILTERED BATTERY CURRENT BASED VEHICLE SPEED LIMITER

TECHNICAL FIELD

This disclosure relates to electric vehicles and more specifically to controls for limiting a vehicle speed based on current capacity of an electrical distribution system.

BACKGROUND

Powertrain electrification is used by automakers to improve fuel economy. These systems can have higher electrical ratings and use a number of high and low voltage components. To minimize the cost of production these components are often sized as small as possible, and still cover a majority of the customer use cases. Certain use cases might overload one or more electrical components. Overloading may result in overtemperature of the components.

SUMMARY

According to one embodiment, a vehicle includes an electrified propulsion system having an electric machine powered by a traction battery over an electrical distribution system (EDS). A controller is programmed to, reduce a speed limit of the vehicle from a maximum speed limit to an EDS speed limit in response to a measured average current of the EDS being within a threshold percentage of an average current limit of the EDS, and, in response to a measured speed of the vehicle exceeding the EDS speed limit, command a torque to the electric machine that is less than a driver-demanded torque such that the vehicle is propelled at a speed below the EDS speed limit.

According to another embodiment, a method of limiting vehicle speed based on current capacity of an electrical distribution system (EDS) associated with a traction battery includes reducing a speed limit of a vehicle from a maximum speed limit to an EDS speed limit in response to a measured average current of an EDS being within a threshold percentage of an average current limit of the EDS, and, in response to a measured speed of the vehicle exceeding the EDS speed limit, commanding a torque to an electric machine that is less than a driver-demanded torque such that the vehicle is propelled at a speed below the EDS speed limit.

According to yet another embodiment, a vehicle includes a traction battery, an electric machine electrically connected to the traction battery by an electrical distribution system (EDS), and a controller. The controller is programmed determine a current capacity of the EDS based on a measured average current of the EDS and an average current limit of the EDS, set a speed limit of the vehicle based on the current capacity, and, in response to a measured speed of the vehicle exceeding the speed limit, reduce a torque commanded to the electric machine to slow the vehicle below the EDS speed limit.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
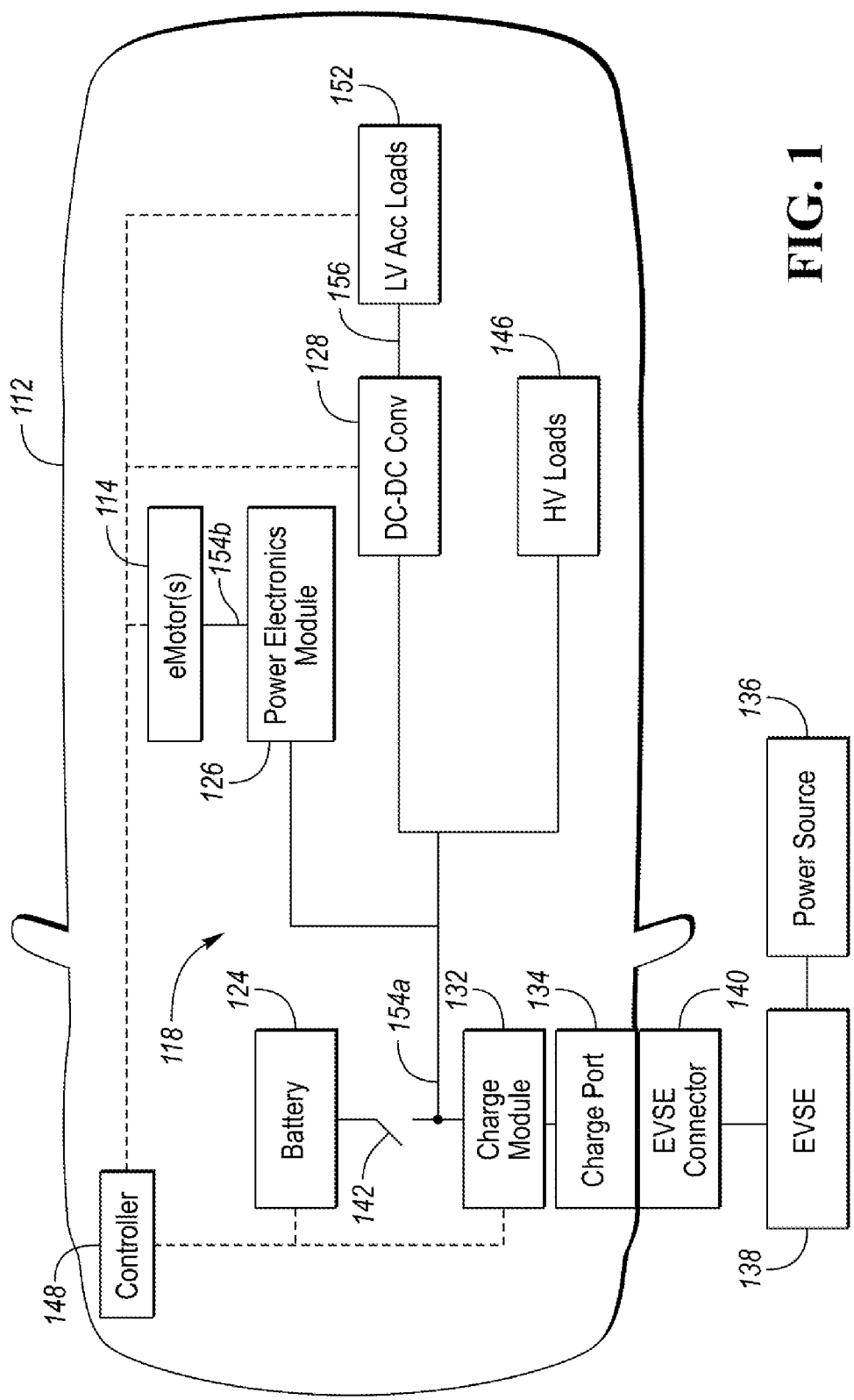
FIG. 1 is a vehicle having electrically-powered components.

FIG. 1 depicts an electric vehicle 112. The vehicle 112 includes an electrified propulsion system having one or more electric machines 114 mechanically coupled to driven wheels. The electric machines 114 may be capable of operating as a motor or a generator. The electric machines 114 are arranged to provide propulsion torque as well as deceleration torque capability. The electric machines 114 are capable of operating as generators to provide fuel economy benefits by recovering energy that would normally be lost as heat in a friction braking system.

A traction battery or battery pack 124 stores energy that can be used to power the electric machines 114. The battery pack 124 typically provides a high-voltage direct current (DC) output. The battery 124 includes an electrical distribution system (EDS) 118 that carries power from the cells to loads and vice versa. Portions of the EDS 118 may be components of the battery 124 and other portions may be external to the battery 124. One or more contactors 142 may isolate the traction battery 124 from a DC high-voltage bus 154A when opened and couple the traction battery 124 to the DC high-voltage bus 154A when closed. The traction battery 124 is electrically coupled to one or more power electronics modules 126 via the DC high-voltage bus 154A. The power electronics module 126 is also electrically coupled to the electric machines 114 and provides the ability to bi-directionally transfer energy between AC high-voltage bus 154B and the electric machines 114. According to some examples, the traction battery 124 may provide a DC current while the electric machines 114 operate using a three-phase alternating current (AC). The power electronics module 126 may convert the DC current to a three-phase AC current to operate the electric machines 114. In a regenerative mode, the power electronics module 126 may convert the three-phase AC current output from the electric machines 114 acting as generators to DC current compatible with the traction battery 124.

In addition to providing energy for propulsion, the traction battery 124 may provide energy for other vehicle electrical systems. The vehicle 112 may include a DC/DC converter module 128 that is electrically coupled to the high-voltage bus 154. The DC/DC converter module 128 may be electrically coupled to a low-voltage bus 156. The DC/DC converter module 128 may convert the high-voltage DC output of the traction battery 124 to a low-voltage DC supply that is compatible with low-voltage vehicle loads 152. The low-voltage bus 156 may be electrically coupled to an auxiliary battery 130 (e.g., 12V battery). The low-voltage loads 152 may be electrically coupled to the low-voltage bus 156. The low-voltage loads 152 may include various controllers within the vehicle 112.

The traction battery 124 of vehicle 112 may be recharged by an off-board power source 136. The off-board power source 136 may be a connection to an electrical outlet. The external power source 136 may be electrically coupled to a charger or another type of electric vehicle supply equipment (EVSE) 138. The off-board power source 136 may be an electrical power distribution network or grid as provided by an electric utility company. The EVSE 138 provides circuitry and controls to regulate and manage the transfer of energy between the power source 136 and the vehicle 112. The off-board power source 136 may provide DC or AC electric power to the EVSE 138. The EVSE 138 includes a charge connector 140 for plugging into a charge port 134 of the vehicle 112. The charge port 134 may be any type of port configured to transfer power from the EVSE 138 to the vehicle 112. The charge port 134 may be electrically coupled to a charge module or on-board power conversion module 132. The power conversion module 132 conditions power supplied from the EVSE 138 to provide the proper voltage and current levels to the traction battery 124. The power conversion module 132 interfaces with the EVSE 138 to coordinate the delivery of power to the vehicle 112. The EVSE connector 140 may have pins that mate with corresponding recesses of the charge port 134. Alternatively, various components described as being electrically coupled or connected may transfer power using wireless inductive coupling or other non-contact power transfer mechanisms. The charge components including the charge port 134, power conversion module 132, power electronics module 126, and DC-DC converter module 128 may collectively be considered part of a power interface system configured to receive power from the off-board power source 136.

When the vehicle 112 is plugged in to the EVSE 138, the contactors 142 may be in a closed state so that the traction battery 124 is coupled to the high-voltage bus 154 and to the power source 136 to charge the battery. The vehicle may be in the ignition-off condition when plugged in to the EVSE 138.

One or more wheel brakes (not shown) may be provided as part of a braking system to decelerate the vehicle 112 and prevent motion of the vehicle wheels. The brakes may be hydraulically actuated, electrically actuated, or some combination thereof. The brake system may also include other components to operate the wheel brakes. The brake system may include a controller to monitor and coordinate operation. The controller monitors the brake system components and controls the wheel brakes 144 for vehicle deceleration. The brake system also responds to driver commands via a brake pedal input and may also operate to automatically implement features such as stability control. The controller of the brake system may implement a method of applying a requested brake force when requested by another controller or sub-function.

One or more high-voltage electrical loads 146 may be coupled to the high-voltage bus 154. The high-voltage electrical loads 146 may have an associated controller that operates and controls the high-voltage electrical loads 146 when appropriate. The high-voltage loads 146 may include components such as compressors and electric heaters. According to a specific example, a vehicle air conditioning system may draw as much as 6 kW under high cooling loads.

The various components discussed may have one or more associated controllers to control, monitor, and coordinate the operation of the components. The controllers may communicate via a serial bus (e.g., Controller Area Network (CAN)) or via discrete conductors. In addition, a vehicle system controller 148 may be provided to coordinate the operation of the various components.

While illustrated as one controller, the controller may be part of a larger control system and may be controlled by various other controllers throughout the vehicle 112, such as a vehicle system controller (VSC). It should therefore be understood that the controller and one or more other controllers can collectively be referred to as a "controller" that controls various actuators in response to signals from various sensors to control functions. The controller may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle. The controller communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU.

In one embodiment, a system controller 148, although represented as a single controller, may be implemented as one or more controllers, may monitor operating conditions of the various vehicle components. According to the example of FIG. 1, at least the electric machines 114, the EDS 118, the traction battery 124, the DC-DC converter 128, the charging module 132, the high-voltage loads 146, and low-voltage loads 152 are in communication with the controller 148. The traction battery 124 also includes a current sensor to sense current that flows through the traction battery 124. The traction battery 124 also includes a voltage sensor to sense a voltage across terminals of the traction battery 124. The voltage sensor outputs a signal indicative of the voltage across the terminals of the traction battery 124. The traction battery current sensor outputs a signal indicative of a magnitude and direction of current flowing into or out of the traction battery 124.

The charging module 132 also includes a current sensor to sense current that flows from the EVSE 138 to the traction battery 124. The current sensor of the charging module 132 outputs a signal indicative of a magnitude and direction of current flowing from the EVSE 138 to the traction battery 124.

The current sensor and voltage sensor outputs of the traction battery 124 are provided to the controller 148. The controller 148 may be programmed to compute a state of charge (SOC) based on the signals from the current sensor and the voltage sensor of the traction battery 124. Various techniques may be utilized to compute the state of charge. For example, an ampere-hour integration may be implemented in which the current through the traction battery 124 is integrated over time. The SOC may also be estimated based on the output of the traction battery voltage sensor 104. The specific technique utilized may depend upon the chemical composition and characteristics of the particular battery.

The controller 148 may also be configured to monitor the status of the traction battery 124. The controller 148 includes at least one processor that controls at least some portion of the operation of the controller 148. The processor allows onboard processing of commands and executes any number of predetermined routines. The processor may be coupled to non-persistent storage and persistent storage. In an illustrative configuration, the non-persistent storage is random access memory (RAM) and the persistent storage is flash memory. In general, persistent (non-transitory) storage can include all forms of storage that maintain data when a computer or other device is powered down.

A desired SOC operating range may be defined for the traction battery 124. The operating ranges may define an upper and lower limit at which the SOC of the battery 124 is bounded. During vehicle operation, the controller 148 may be configured to maintain the SOC of the battery 124 within the desired operating range. In other cases, the battery is recharged when at rest and connected to an off-board power source. Based on a rate of battery depletion and/or recharge, charging of the traction battery may be scheduled in advance based on approaching an SOC low threshold. The timing and rate of recharging may also be opportunistically selected to maintain voltage and SOC within predetermined ranges.

While not shown, the vehicle 112 includes an accelerator pedal that enables the driver to request torque. The vehicle may be programmed to determine a driver-demanded torque based on a position of the accelerator pedal and vehicle speed. The driver-demanded torque may be a raw wheel torque that is commanded by the driver and is used to control the torque produced by the motors 114.

Hardware protection strategies monitor and limit the current of the EDS 118 and other systems such as the HV bus. The protection strategy may include measuring battery current with a sensor or inferring the current. The current is filtered and squared, which will be referred to herein as "filtered current squared" (FIS). The filtered current squared is then averaged for a time window to determine an average current for that time window. The controller may calculate a plurality of average currents for plurality of different time windows each having different durations. Each of these time windows have an associated average current limit, which represents the maximum permitted average current. The average currents of each time window are compared to the limits of these time window to determine a current capacity. The current capacity indicates a percentage/ratio of the current limit being utilized. The current capacity may be normalized to have a value between zero and one in one or more embodiments. A capacity of zero means that no capacity is left, i.e., the average current is equal or exceeds the average current limit, and a capacity of one means that the 100 percent of the capacity is left, i.e., the average current is equal to zero. According to one embodiment, the current capacity is equal to a difference between the average current limit and the measured average current, divided by the average current limit. For example, if the average current limit was 80 and the measured average current was 65, the capacity would be 0.1875.

Operating a vehicle at high speed, such as near maximum speed, requires high current through the EDS 118, and, after a prolonged time, the measured average currents may near or exceed the average current limits. Once the capacity for one or more time windows nears zero, the vehicle must be power limited to reduce the current through the EDS 118. Power limiting the vehicle, results in deceleration and poor performance. During power limiting, the vehicle may not provide the driver-demanded torque resulting in a disconnect between driver expectations and vehicle performance.

In one implementation, the system may allow the vehicle to operate at or near max speed based on the driver-demanded torque until the capacity reaches zero, at which point the vehicle is power limited and the vehicle speed substantially slows. A better solution, however, is to gradually reduce the maximum speed as capacity diminishes to mitigate instances in which power limiting is necessary. Due to the nature of aerodynamic drag, small reductions in vehicle speed substantially reduce the required current. As such, slight reduction in maximum speed can prevent current saturation of the EDS 118 in many instances so that drastic power limiting never occurs.

Figure 2:
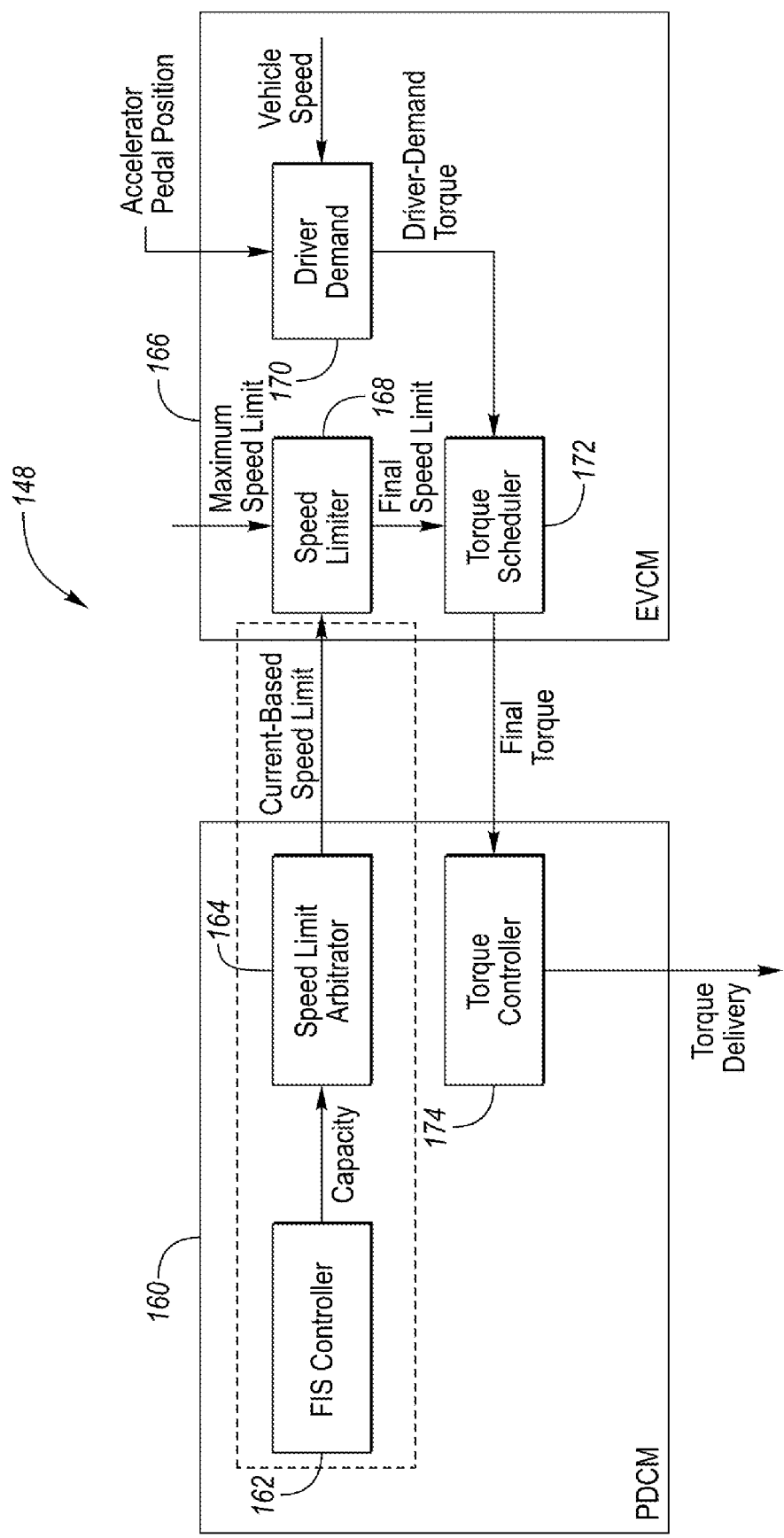
FIG. 2 is a schematic diagram of a control system that limits torque to an electric machine based on current flow through an electrical distribution system associated with a traction battery to control vehicle speed below a limit.

FIG. 2 illustrates an example control diagram of at least a portion of the controller 148. The controller 148 may include a primary drive control module (PDCM) 160 having an FIS controller 162 that monitors the measured current of the EDS 118 and determines the capacity as discussed above. The FIS controller 162 outputs current capacities of the time windows to the speed limit arbitrator 164. The speed limit arbitrator 164 may include a one or more lookup tables that correlate a current-based speed limit (also referred to as an EDS speed limit) with current capacity. For example, the lookup tables output a current-based speed limit for a given capacity. Table 1 illustrates an example simplified table to illustrate the concept. In example table 1, the current-based speed limit (180 kilometers per hour, which is the maximum speed limit) is not reduced until the capacity is diminished to 0.3, at which point the current-based speed limit is reduced. This, of course, is just an example. The arbitrator 164 may include a plurality of lookup tables each corresponding to one of the time windows. Alternatively, a same lookup table may be used for all the time windows and mitigates based on the minimum capacity of any of those tables.

TABLE 1

| Capacity | Speed Limit |
|---|---|
| 0 | 150 |
| 0.025 | 153 |
| 0.050 | 155 |
| 0.075 | 158 |
| 0.100 | 160 |
| 0.125 | 170 |
| 0.150 | 175 |
| 0.200 | 178 |
| 0.300 | 179 |
| 0.400 | 180 |
| 1.000 | 180 |

The arbitrator 164 outputs the current-based speed limit to the electric vehicle control module EVCM 166 in an example embodiment. The Speed limiter 168 receives the current-based speed limit and the overall maximum speed limit of the vehicle. The speed limiter 168 is configured to choose the minimum of the current-based speed limit and the maximum speed limit and output that minimum as the final speed limit. For example, if the current-based speed limit is 178 KPH and the maximum speed limit is 180 KPH, then the speed limit 168 outputs a final speed limit of 178 KPH.

The driver-demanded torque is calculated by box 170 based on the accelerator pedal position and the vehicle speed. Box 170 outputs a raw driver-demanded torque to the torque scheduler 172. The final speed limit is also output to the torque scheduler 172. The torque scheduler 172 is configured to output a final torque command to the torque controller 174. The torque scheduler 172 is configured to reduce the final torque to be less than the driver-demanded torque based on the final speed limit.

The speed limiter function compares the vehicle speed to the active speed limit to calculate an error. Based upon this error, the speed limiter uses a lookup table to select a maximum permissible acceleration. The acceleration is converted to a wheel-torque limit based upon vehicle mass and gearing between the actuator and wheels. This will restrict max acceleration as the vehicle approaches the speed limit but is also capable of enforcing a negative acceleration to slow the vehicle down if the vehicle speed increases over the target speed.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, and/or powertrain controller, such as controller 148. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 3:
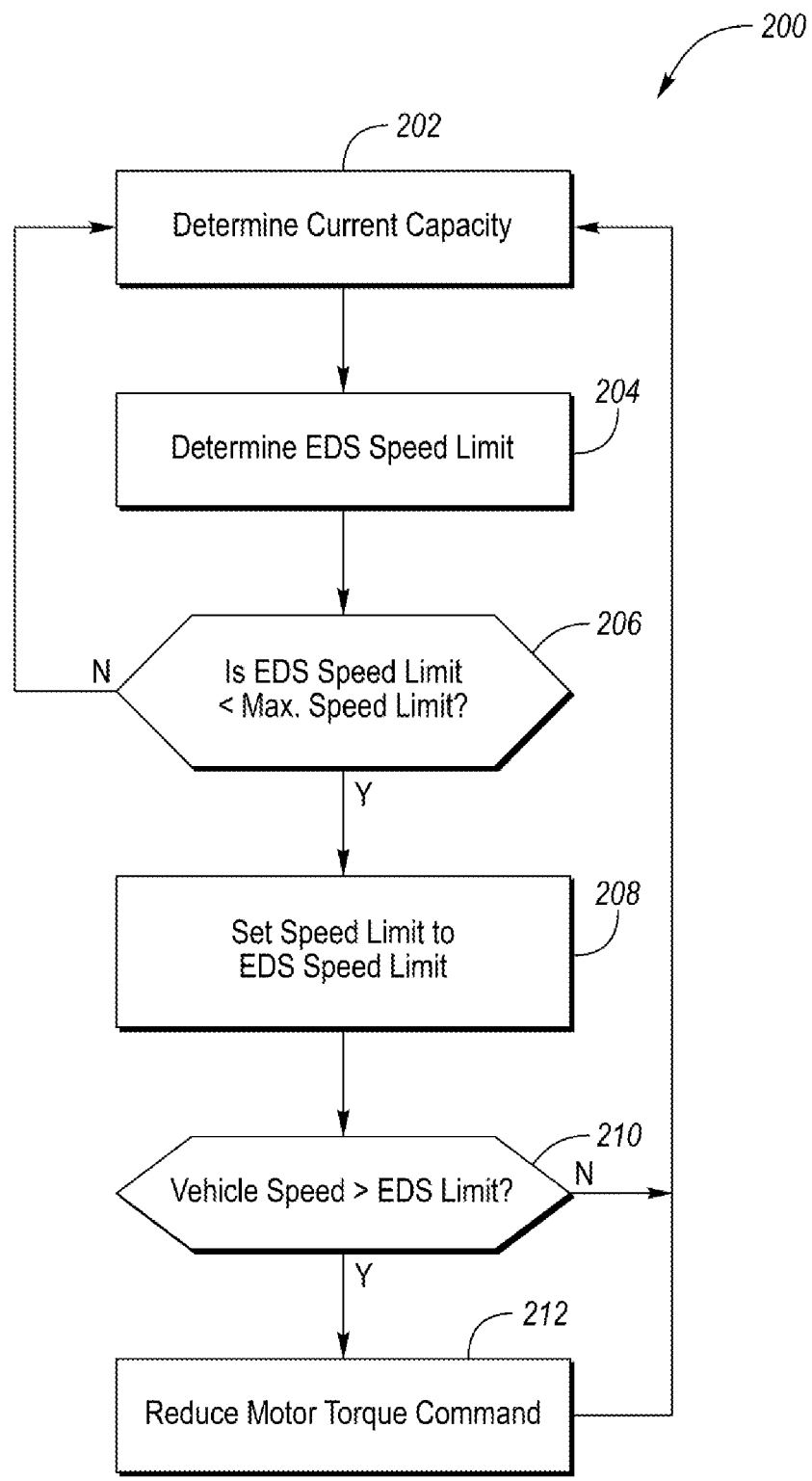
FIG. 3 is a flow chart of an algorithm for controlling torque commanded to an electric machine based on a current-based speed limit.

FIG. 3 is a flowchart 200 of an algorithm for controlling a vehicle speed limit and torque commands for an electric machine when current capacity is low, e.g., below 35 percent. Control begins at operation 202 where the controller determines the current capacity based on a measured average current of the EDS and an average current limit of the EDS. As stated above, multiple capacities may be calculated for each of the various time windows. At operation 204, the controller determines an EDS speed limit of the vehicle based on the capacity. The controller may determine multiple EDS speed limits for the multiple time windows at operation 204. The minimum of the EDS speed limits is output to operation 206 where the controller determines if the EDS vehicle speed limit is less than the maximum vehicle speed limit. If no, the maximum speed limit remains the limit and control passes back to the start. If yes, the controller sets the vehicle speed limit to the EDS speed limit at operation 208. At operation 210, the controller determines if the vehicle speed exceeds or nears the EDS limit. If no, other logic is used to control the torque based on the driver-demanded torque. If yes, control passes to operation 212 and the torque commanded to the electric machine is reduced so that the vehicle speed slows below the EDS speed limit. At operation 212, the EDS speed limit may clip the torque below the driver-demanded torque in order to bring the vehicle speed below the EDS speed limit. As stated above, however, small reductions in vehicle speed translate to large reductions in the current flow through the EDS. As such, in many instances, the driver will not perceive the torque reduction as being below the driver-demanded torque.

The above-described controls and methods substantially reduce the instances of power limiting when the vehicle is driven at high speeds by anticipating current saturation of the EDS and gradually reducing a permissible vehicle speed limit. The small reductions in the speed limit result in large reductions of current through the EDS and extend, if not eliminate, the need to power limit the vehicle. This results in a more pleasurable driving experience.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an electrified propulsion system including an electric machine powered by a traction battery over an electrical distribution system (EDS);
   a current sensor configured to output a measured current associated with the EDS; and
   a controller programmed to:
   reduce a speed limit of the vehicle from a maximum speed limit to an EDS speed limit in response to an average of the measured current (measured average current) of the EDS being within a threshold percentage of an average current limit of the EDS, and
   in response to a measured speed of the vehicle exceeding the EDS speed limit, command a torque to the electric machine that is less than a driver-demanded torque such that the vehicle is propelled at a speed below the EDS speed limit.

2. The vehicle of claim 1, wherein a value of the EDS speed limit is based on a ratio between the measured average current and the average current limit.

3. The vehicle of claim 1, wherein a value of the EDS speed limit increases as the measured average current decreases, and the value of the EDS speed limit decreases as the measured average current increases.

4. The vehicle of claim 1, wherein a value of the EDS speed limit is based on a current capacity that is equal to a difference between the average current limit and the measured average current, divided by the average current limit.

5. The vehicle of claim 1, wherein a value of the EDS speed limit decreases as the current capacity decreases.

6. The vehicle of claim 1, wherein the threshold percentage is less than 35 percent.

7. The vehicle of claim 1, wherein the torque commanded to the electric machine is based a speed of the vehicle and a maximum permissible acceleration of the vehicle.

8. The vehicle of claim 1, wherein the driver-demanded torque is based on an accelerator pedal position.

9. A method of limiting vehicle speed based on current capacity of an electrical distribution system (EDS) associated with a traction battery, the method comprising:
reducing a speed limit of a vehicle from a maximum speed limit to an EDS speed limit in response to a measured average current of an EDS being within a threshold percentage of an average current limit of the EDS; and
in response to a measured speed of the vehicle exceeding the EDS speed limit, commanding a torque to an electric machine that is less than a driver-demanded torque such that the vehicle is propelled at a speed below the EDS speed limit.

10. The method of claim 9 further comprising:
setting a value of the EDS speed limit based on a ratio between the measured average current and the average current limit.

11. The method of claim 10, wherein a value of the EDS speed limit increases as the measured average current decreases, and the value of the EDS speed limit decreases as the measured average current increases.

12. The method of claim 9 further comprising:
setting a value of the EDS speed limit based on a current capacity that is equal to a difference between the average current limit and the measured average current, divided by the average current limit.

13. The method of claim 12, wherein a value of the EDS speed limit decreases as the current capacity decreases.

14. The method of claim 9 further comprising:
determining the driver-demanded torque based on an accelerator pedal position.

15. The method of claim 9, wherein the threshold percentage is less than 35 percent.

* * * * *